March 27, 1928.

F. A. STEVENS 1,664,093

OPHTHALMIC MOUNTING AND METHOD OF MAKING THE SAME

Filed Jan. 20, 1923

Inventor:
Frederick A. Stevens.
by David Rines
Attorney:-

Patented Mar. 27, 1928.

1,664,093

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING AND METHOD OF MAKING THE SAME.

Application filed January 20, 1923. Serial No. 613,811.

The present invention relates to ophthalmic mountings, particularly to mountings comprising parts constituted of non-metallic material, such as shell, celluloid, zylonite and the like, and to methods of making such mountings.

Two classes of mountings of the above-described character are in common use: first, those constituted of non-metallic elements only, which may be referred to, for brevity, as of the all-zylonite type; and secondly, mountings of the combination-metal-and-non-metallic type, in which the non-metallic parts are reinforced by metal parts. Each class has its distinctive individuality. Mountings of the all-zylonite type have a tendency to warp or bend, resulting from contraction and expansion caused by variations of atmosphere and weather, and for other reasons, which induce variations in the shape and the size of the mountings. Under some conditions, even, the mountings of this class become readily broken. Mountings of the second, or combination-metal-and-non-metallic type, are not subject to this defect, but they have an individuality of their own, quite distinct from that of the all-zylonite type.

It is therefore an object of the present invention to impart to mountings of the all-zylonite type the rigidity and other enduring qualities usually found in mountings of the combination - metal - and - non - metallic type.

With this end in view, a feature of the invention resides in embedding a reinforcing element or elements between non-metallic parts, and uniting the reinforcing element and the non-metallic parts together. End pieces or other connections may be formed integral with one or more of the reinforcing elements, whereby the temples, for example, may be directly connected to the lens frame, eliminating the usual difficulties involved in connections of this character.

Other objects will be explained hereinafter and will be particularly pointed out in the appended claims.

To the attainment of the above object, the invention consists of the improved ophthalmic mounting and method of making the same a preferred embodiment of which is hereinafter described, illustrated in the accompanying drawings, and defined in the appended claims.

Figure 1:
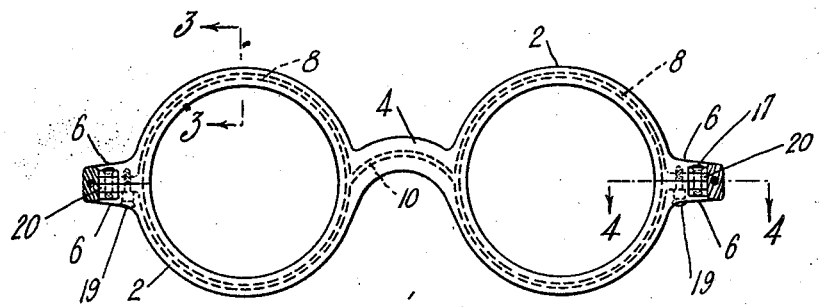
Figure 2:
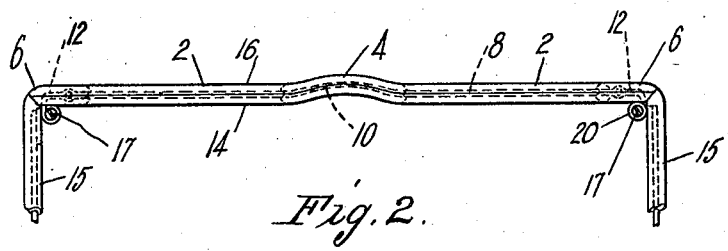
Figure 3:
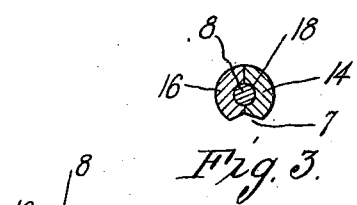
Figure 4:
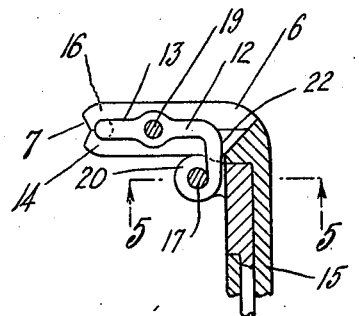
Figure 5:
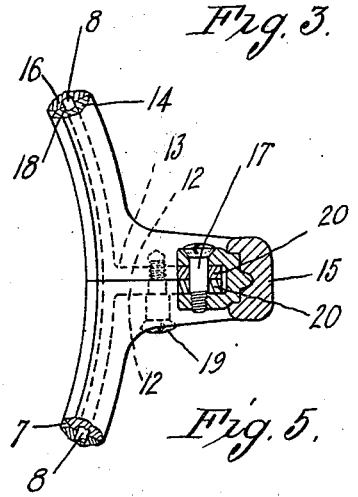
Figure 6:
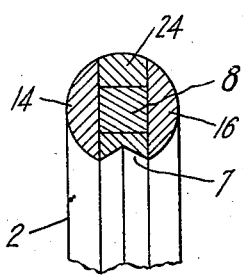

In the drawings, Fig. 1 is a rear elevation of a spectacle mounting constructed according to a preferred embodiment of the present invention, the temples being shown in section; Fig. 2 is a plan view of the same; Fig. 3 is an enlarged section taken upon the line 3—3 of Fig. 1; Fig. 4 is an enlarged section taken upon the line 4—4 of Fig. 1; Fig. 5 is a section taken upon the line 5—5 of Fig. 4, looking in the direction of the arrows; and Fig. 6 is a view similar to Fig. 3 of a modification.

The lens-holding frame comprises two split lens-holding eyes 2, connected by a bridge 4, and each provided with two oppositely disposed temple ears 6, the parts all integrally constituted of non-metallic material. The usual lens-receiving groove is shown at 7.

To prevent warping, bending, breaking, etc., the mounting is, according to the present invention, reinforced by a reinforcing part or parts, preferably of metal. It is preferred to employ a metal skeleton comprising, as shown, two split eye wires 8, connected by a bridge 10, and each provided with two oppositely disposed temple end pieces 12, all integrally connected together. The eye wires, the bridge, the end pieces, etc., or any combination of them, may, however, be formed in separate parts, though this is not illustrated because such additional illustration is considered to be unnecessary. If separate parts are employed, they may be harder tempered, and the necessity for soldering will, furthermore, be avoided.

The reinforcing part or parts may be assembled with the non-metallic material in any desired manner. According to the preferred method of assembly, the non-metallic element is formed in two halves or portions 14 and 16, each in the form of a non-metallic sheet, and each is provided with a groove or grooves 18 to receive the reinforcing part or parts. The sheets may be formed in any well known manner, as by stamping from sheet stock. The groove or grooves 18 are of the same shape as the metal, preferably round in cross section, and they extend through the eyes 2, the bridge 4 and each of the ears 6. The portions 13 of the grooves 18 in the ears 6 are preferably so constructed as to have the metal end pieces 12 lie flush with the non-metallic material, as is clearly illustrated in Figs. 4 and 5. The metal is inserted in the grooves of one of the non-metallic sheets 14 and 16, the other sheet is then mounted in position over the one sheet so as to have the metal lie in the corresponding grooves of both non-metallic sheets, and the parts are then integrally united together in any desired manner, as by the use of cement previously applied at the contacting faces and pressure. The result is an ophthalmic mounting formed of non-metallic flat sheets with a reinforcing metal skeleton embedded between them. No additional means for holding the non-metallic material upon the metal skeleton is necessary.

The end pieces 12 are shown integrally provided with oppositely disposed parts 20 that project through openings 22 in the portion 14. Owing to the above-described construction of the grooves 13, the end pieces 12 and the parts 20 will lie in face-to-face contact. The usual temples 15 may be pivoted to the parts 22 by means of a pivotal screw 17. The use of additional temple-connecting hinges that are customarily secured to the lens-holding frame is thus avoided. As will be clear from Fig. 5, the screw 17 serves also, in some degree, to hold the combination metal and non-metallic end pieces of each split rim together. In order not to disturb the temple-pivoting function of the screw 17, an additional screw 19 is provided, extending through one end piece and into the other, to hold the split ends of the rim together.

The non-metallic sheets 14 and 16 need not be of the same thickness, as shown in the preferred construction. One of the sheets may be considerably thicker than the other. The cross-sectional contour of the reinforcing metal part or parts, and the grooves 18 for receiving them, will then be suitably modified to admit assembly. As is illustrated and described in a copending application, Serial No. 486,703, filed July 22, 1921, of which the present application is a continuation in part, one only of the non-metallic sheets need be provided with the groove 18, the groove being of a thickness equal to the thickness of the reinforcing rod 8, and the other sheet may be ungrooved and may lie flat against the metal and the grooved sheet. Not two sheets alone, furthermore, but any desired number of laminated non-metallic sheets, three, for example, may be employed. The third or intermediate sheet 24 may alone be provided with the groove or grooves 18, the outside sheets being ungrooved. The groove 18 may be adapted to receive a round reinforcing rod 8, a square rod, or a rod of any other cross-sectional shape.

It is not essential that any of the non-metallic sheets be previously provided with the metal-receiving grooves 18. The mounting may be manufactured from previously ungrooved sheets by inserting a metal skeleton between them and molding the parts together by heat and pressure. Cement may be used here also, if desired.

It will be appreciated that the invention is not restricted to the exact embodiments thereof that are herein illustrated and described, as modifications may be made by persons skilled in the art without departing from its spirit and scope. It is therefore desired that the above description be regarded as illustrative and not restrictive, and that the invention be considered as defined in the appended claims.

What is claimed is:

1. An ophthalmic mounting comprising non-metallic sheets disposed side by side in face-to-face contact and integrally united together along the contacting faces with one or more reenforcing parts between them.

2. An ophthalmic mounting comprising non-metallic sheets disposed in face-to-face contact and integrally united together along the contacting faces with one or more reenforcing parts between them, one of the reenforcing parts having an end piece projecting through the non-metallic material.

3. An ophthalmic mounting comprising non-metallic sheets each comprising split lens-holding eyes, a bridge and ears, and a reenforcing skeleton comprising split eye wires, a bridge and end pieces embedded between the parts.

4. An ophthalmic mounting comprising non-metallic sheets each comprising a lens-holding eye, the sheets being disposed side by side in face-to-face contact and integrally united together along their contacting faces.

5. The method of making an ophthalmic mounting that comprises grooving a non-metallic sheet, inserting one or more reenforcing parts in the groove, assembling the sheet with one or more ungrooved non-metallic sheets, and integrally uniting the reenforcing parts and the non-metallic sheets together.

6. An ophthalmic mounting comprising non-metallic sheets each comprising lens-holding eyes and a bridge integral with the lens-holding eyes, and a reinforcing skeleton comprising eye wires and a bridge, the sheets being disposed in face-to-face contact and integrally united together along the contacting faces with the reinforcing skeleton between them.

7. An ophthalmic mounting comprising non-metallic sheets, each comprising lens-holding eyes, a bridge and ears, the sheets being disposed side by side in face-to-face contact and integrally united together along their contacting faces.

8. An ophthalmic mounting comprising non-metallic sheets each comprising split lens-holding eyes, a bridge and two oppositely disposed ears, and a reinforcing skeleton comprising split eye wires, a bridge and two oppositely disposed end pieces embedded between the sheets, means connecting the oppositely disposed end pieces of each split rim, and a temple pivoted at the split ends of each rim.

9. An ophthalmic mounting comprising non-metallic sheets each comprising split-lens-holding eyes, a bridge and two oppositely disposed ears, and a reinforcing skeleton comprising split eye wires, a bridge and two oppositely disposed end pieces embedded between the sheets, the end pieces lying flush with the non-metallic material and having oppositely disposed parts projecting through the non-metallic material, means connecting the split ends of the rims together, and temples pivoted to the projecting parts.

10. An ophthalmic mounting comprising lens-holding members and a bridge connecting the lens-holding members comprising non-metallic material, and a metal reinforcement comprising parts reinforcing both lens-holding members and the bridge, said reinforcement being wholly enclosed within the non-metallic material.

11. An ophthalmic mounting having, in combination, non-metallic sheet stock in the form of two lens-holding members and a bridge connecting the lens-holding members, and a metal reinforcement having a portion wholly enclosed in each lens-holding member and a portion wholly enclosed in the bridge, the metal reinforcement and the sheet stock being integrally joined together in a unitary structure.

12. The method of making an ophthalmic mounting that comprises correspondingly grooving and cementing non-metallic flat sheets, inserting a reenforcing skeleton in the groove of one of the sheets, mounting the other sheet over the one sheet so that the sheets shall be disposed in face-to-face contact in their flat-sheet condition and so that the reenforcing elements shall lie also in the groove of the other sheet, and integrally uniting the sheets and the skeleton together at the contacting faces of the sheets.

13. An ophthalmic mounting of the character described, comprising two longitudinally divided flat-sheet-stock half sections, each section having two half end pieces, two half eye sections, and a half bridge portion, the flat-sheet-stock sections being disposed in face-to-face contact in their flat-sheet condition, and a cementitious medium uniting the two flat-sheet sections along the longitudinal division line at their contacting faces.

14. The process of forming an ophthalmic mounting consisting of forming portions thereof from flat-sheet composition stock, placing the portions together in their flat-sheet condition in face-to-fact contact, and uniting the portions together at their contacting faces.

15. The process of forming an ophthalmic mounting consisting of stamping halves thereof from flat-sheet stock, placing two halves together in their flat-sheet condition in face-to-face contact, and uniting the halves at their contacting faces.

16. The process of forming an ophthalmic mounting consisting of forming a frame member from metallic stock, forming two plastic flat-sheet celluloid composition strips, inserting the frame member between the two plastic flat-sheet celluloid composition strips in their flat-sheet condition in face-to-face contact, the flat-sheet strips being so shaped as to provide a lens-receiving groove between them when they are assembled with the frame member, and uniting the strips together at their contacting faces.

17. An ophthalmic mounting comprising two half section sheets each comprising lens-holding eyes, a bridge and ears, and a reinforcing skeleton comprising eye wires, a bridge and end pieces, the sheets being integrally united together in face-to-face contact along the contacting faces with the skeleton between them.

18. An ophthalmic mounting comprising non-metallic strips disposed side by side in face-to-face contact and integrally united together along the contacting faces with a reinforcing rod of square cross section between them.

In testimony whereof, I have hereunto subscribed my name this 11th day of January, 1923.

FREDERICK A. STEVENS.